No. 765,040. PATENTED JULY 12, 1904.
W. J. PUGH.
PRESSURE CONTROLLED ELECTRIC SWITCH.
APPLICATION FILED DEC. 24, 1903.
NO MODEL. 2 SHEETS—SHEET 2.

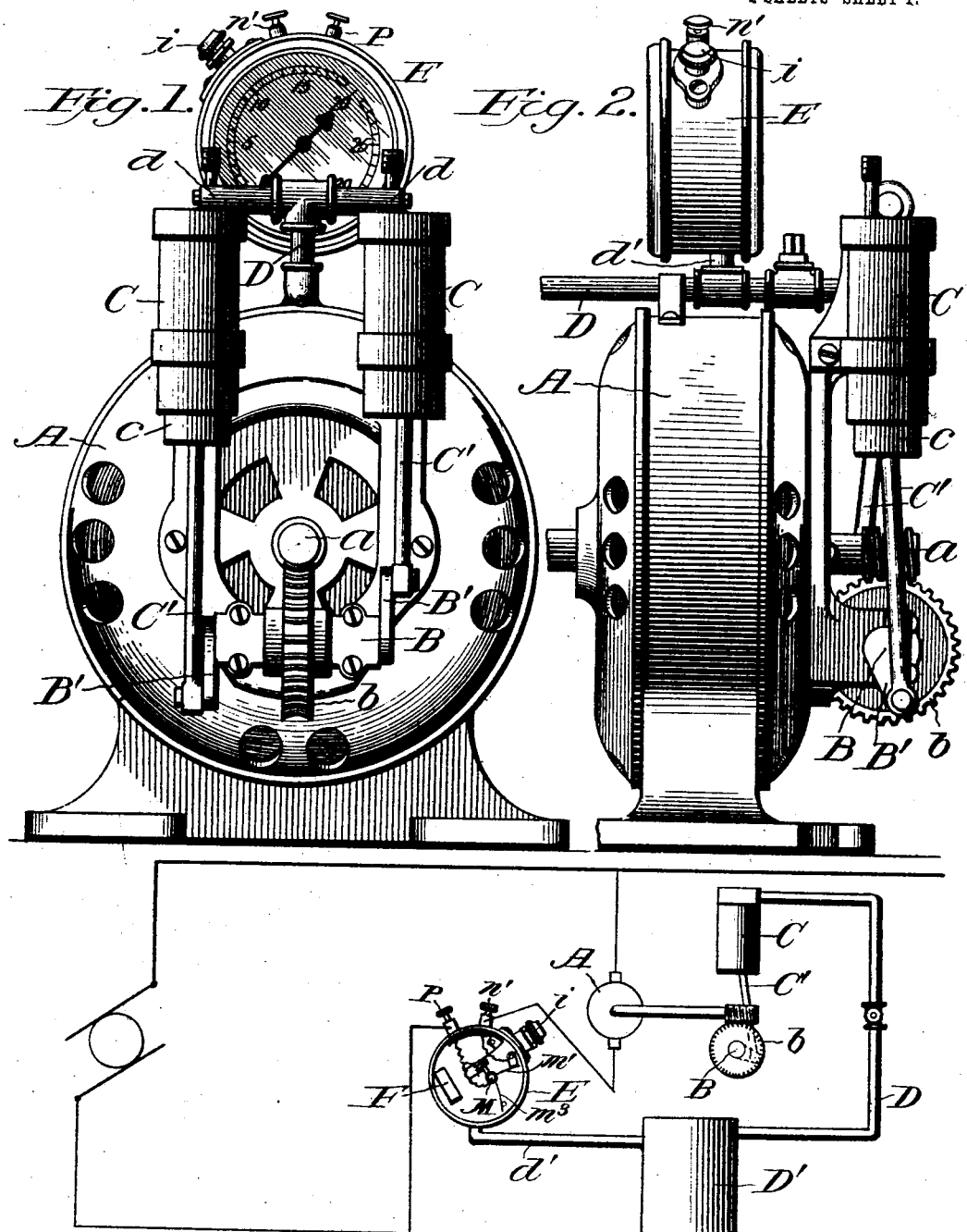

WITNESSES:
C. H. Walker.
L. E. Witham.

INVENTOR
William J. Pugh
By
Alexander & Fowell
Attorneys

No. 765,040. Patented July 12, 1904.

UNITED STATES PATENT OFFICE.

WILLIAM J. PUGH, OF DAVENPORT, IOWA, ASSIGNOR, BY DIRECT AND MESNE ASSIGNMENTS, TO AUTOMATIC ELECTRIC PUMP COMPANY, OF DAVENPORT, IOWA.

PRESSURE-CONTROLLED ELECTRIC SWITCH.

SPECIFICATION forming part of Letters Patent No. 765,040, dated July 12, 1904.

Application filed December 24, 1903. Serial No. 186,437. (No model.)

*To all whom it may concern:*

Be it known that I, WILLIAM J. PUGH, of Davenport, in the county of Scott and State of Iowa, have invented certain new and useful Improvements in Pressure-Controlled Electric Switches; and I hereby declare that the following is a full, clear, and exact description thereof, reference being had to the accompanying drawings, which form part of this specification.

This invention is an improved device for controlling the operation of electrically-controlled motors used for compressing air or fluids, the invention residing in novel means whereby when the pressure reaches a predetermined point an electric circuit is broken and the motor put out of operation and when the pressure recedes the circuit is closed and motor operated.

The invention will be clearly understood from the illustration in the accompanying drawings, in connection with the following description thereof, and the features and combinations of parts for which protection is desired are summarized in the claims.

Figure 3:
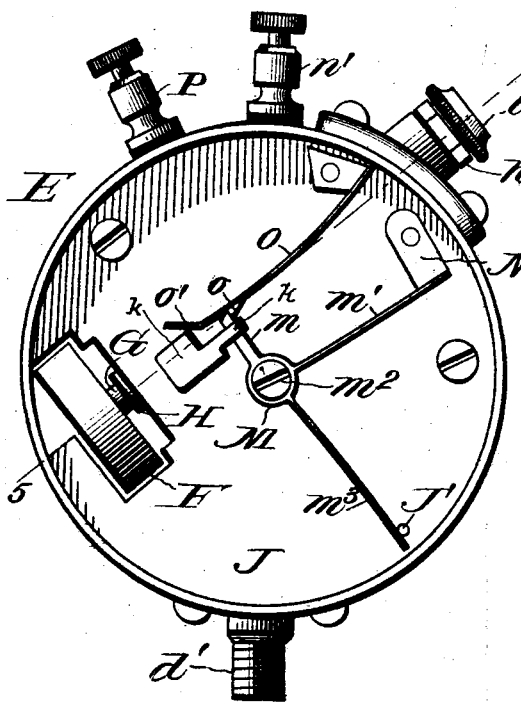
Figure 4:
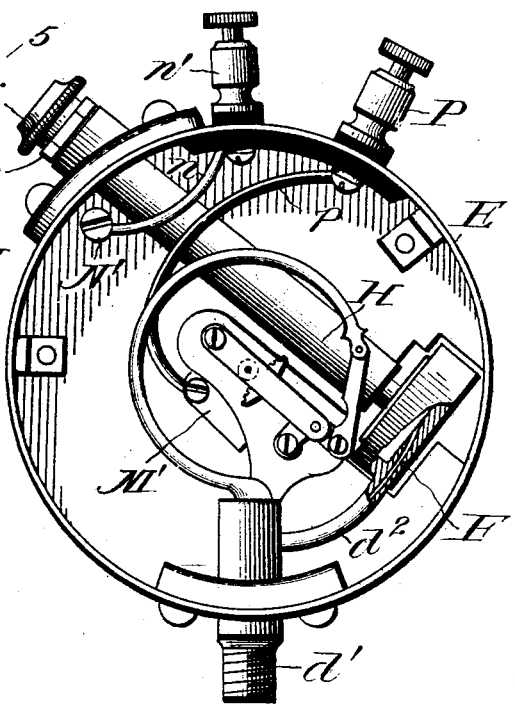
Figure 5:
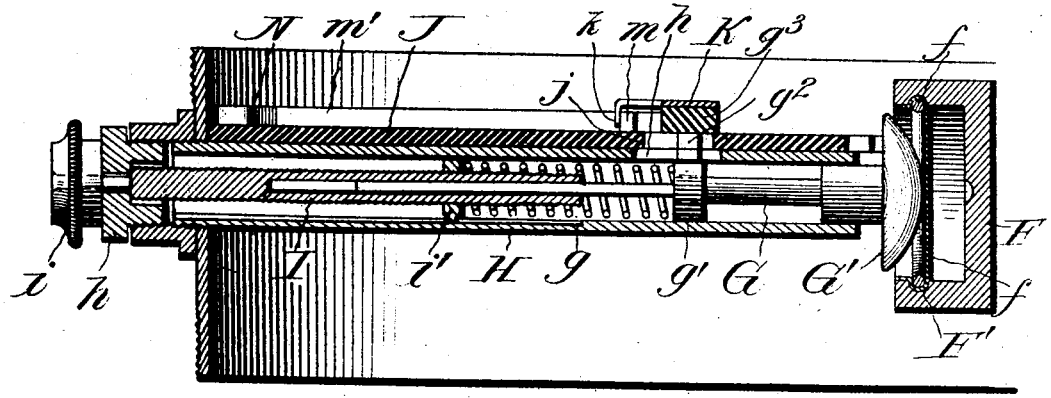

In the drawings, Figure 1 is a front view of the apparatus. Fig. 2 is a side view of Fig. 1. Fig. 3 is an enlarged front view of the gage with the dial-plate removed, showing the electrical connections. Fig. 4 is a rear view of Fig. 3, showing the switch connections. Fig. 5 is an enlarged section on line 5 5, Fig. 3, showing the construction of the regulator for the switch; and Fig. 6 is a diagram of the apparatus, showing the electrical connections.

A designates an electric motor of any suitable construction, having on one end of its armature-shaft a worm $a$, meshing with a worm-gear $b$ on a cross-shaft B, journaled in brackets attached to the motor-casing, as shown. On the ends of shaft B are cranks B', which are connected by pitmen C' to pistons $c$ within vertical air-pumping cylinders C, fastened to the motor-casing above the cranks B'. The cylinders C are provided with suitably-valved inlet and outlet ports, as usual, the outlets connecting with branches $d$ of a pipe D, which is connected to the reservoir or storage-chamber D' of any suitable construction. The pipe D is also connected by a branch $d'$ with an ordinary pressure-gage E, mounted on top of the motor for convenience, and within the casing of gage E, I preferably locate the electrical switch and controller which constitutes the present invention.

By referring to Fig. 4 it will be seen that the pipe $d'$ communicates by a tube $d^2$ with a short cylinder F, which has a flexible diaphragm $f$ in its upper end, said diaphragm being preferably formed of rubber and having its edges confined in an annular groove F' in the cylinder by a spring-ring $f'$. Upon this diaphragm rests a disk G' on the lower end of a plunger-rod G, which enters a tube H, secured in the gage-casing above cylinder F and telescopes into a tubular threaded stem I, which is rotatably (but longitudinally immovably) secured in the tube by a screw-cap $h$, as shown in Fig. 5.

Stem I has a thumb-piece $i$ on its outer end, by which it can be rotated so as to cause a nut $i'$ thereon within tube H to move up or down and more or less compress a helical spring $g$, strung on plunger G and stem I, intermediate nut H and a collar $g'$ on stem G, as shown in Fig. 5. The nut $i'$ may be kept from rotation in any suitable manner, as by a spline, as is well known. By this means the disk G' can be more or less forcibly seated on the diaphragm $f$. Attached to collar $g'$ is an arm $g^2$, which projects through a slot $h'$ in the side of tube H and through an aperture $j$ in a non-conducting partition or wall J, (secured within the gage-casing to support the controller devices,) and to the outer end of arm $g^2$ is attached an insulating-block $g^3$, on which is mounted a switch-closer K, which has a hooked finger $k$, adapted to engage an arm $m$ of the switch-lever M and rock said lever, so as to throw its switch-tongue $m'$ into contact with the fixed contact-block, as shown. The switch-lever M is pivoted on a screw $m^2$, tapped into a metal block M', attached to the inner side of the insulating-partition J, and the contact-block N is electrically connected, through said partition, to a metal block N' on the inner side of said partition. Lever M has a spring-arm $m^3$, which bears against a pin J' on the partition and tends to rock the lever M, so as to throw tongue $m'$ out and away from block N and break the circuit.

Under the action of spring $g$ (which depresses plunger G) the disk G' presses diaphragm $f$ inward and, through fingers $k$ and $m$, holds tongue $m'$ in contact with block N against the action of the weaker spring $m^3$. When, however, the pressure in the reservoir rises above the desired point—$i.$ $e.$, that to which the tension of spring $g$ is adjusted—the pressure in cylinder F forces diaphragm $f$ outward, lifting plunger G and causing finger $k$ to release arm $m$ and will eventually allow spring $m^3$ to rock the switch-lever and separate tongue $m'$ from block N and break the circuit. In order, however, to insure a sudden break of the circuit, I provide a device for holding arm $m$ down until finger $k$ is so far removed that if arm $m$ be released the spring $m^3$ can snap tongue $m'$ away from contact N without danger of arcing. For this purpose a spring-catch O is provided, one end of which is attached to the partition J, and its free end lies adjacent to the end of arm $m$ and block K. Catch O has a beveled tooth $o$, which when the switch is closed springs over the finger $m$ and will hold the latter down as finger $k$ rises and keep the switch closed until the part K strikes the bent end $o'$ of the catch and forces it outward, disengaging tooth $o$ from arm $m$ and allowing spring $m^3$ to snap tongue $m'$ away from contact N, breaking the circuit immediately. When the pressure falls and plunger G descends under the greater pressure of spring $g$, finger $k$ catches arm $m$ and closes the switch and catch O springs in and holds the switch closed, as described, until the plunger again ascends.

The block N' is electrically connected, as by a wire $n$, to an insulated binding-post $n'$ on the casing. Similarly plate M' is electrically connected by wire $p'$ to an insulated binding-post P on the casing. One of these posts may be connected to one terminal of the motor and the other binding-post to the line or electric supply, while the other terminal of the motor is connected to the return-line or ground, as indicated in Fig. 6. Thus the opening or closing of the switch will stop or start the motor. The point at which the switch will be opened can be readily determined by adjusting the tension of spring $g$ so that the plunger will be lifted when the gage-indicator shows the desired pressure in the reservoir. While I preferably for compactness and convenience mount the pump and electric controller on the motor-frame, I do not restrict myself thereto, nor to the mounting of the switch within the gage-casing.

If the contacts $m'$ should happen to stick to block N, a slight increase in the pressure will cause block $g^3$ to strike arm $m$, and thus positively rock the switch-lever and separate the contacts.

Having thus described my invention, what I therefore claim as new, and desire to secure by Letters Patent thereon, is—

1. In a pressure-controlled electric switch, the combination of a contact, a switch-lever carrying a movable contact; a spring for moving the switch-lever to open the contact; and a catch for holding the lever in closed position; with a plunger adapted to be moved one way by pneumatic pressure, a spring for moving the plunger in the opposite direction; a block connected to the plunger and movable therewith, said block being adapted to positively close the switch, under the action of the plunger-spring; and to disengage the catch from the switch-lever under the action of the pneumatic pressure, substantially as described.

2. In an electric pressure-controlled switch, the combination of a cylinder, a plunger working therein, a spring for depressing said plunger, and adjustable means for varying the tension of said spring; with a rocking switch-lever, a finger connected to said plunger for closing the switch, and a spring for throwing the switch open when the plunger permits; with a spring-catch for locking said switch when closed until the plunger has raised sufficiently to permit the switch to be snapped open; and a device operated by the plunger to disengage the catch from the switch, substantially as described.

3. The combination of a contact, a switch-lever adapted to engage said contact, and a spring for rocking said lever away from the contact; a pressure-controlled diaphragm, a spring-pressed plunger engaged therewith, a device attached to said plunger adapted to engage the switch-lever and forcibly close the switch, and a spring-catch adapted to lock the switch in closed position, and a device operated by the plunger to disengage the catch from the switch after the switch-closing device has been moved away from the switch, substantially as described.

4. In a pressure-controlled electric switch, the combination of a plunger subjected to air-pressure on one side, a rotatable threaded rod, a traveling nut on said rod, a spring interposed between said nut and plunger to counteract the air-pressure, and an electric switch controlled by the movements of said plunger, substantially as described.

5. In a pressure-controlled electric switch, the combination of a plunger subjected to air-pressure on one side, a rotatable threaded rod, a traveling nut on said rod, a spring interposed between said nut and plunger to counteract the air-pressure; with a switch beside said plunger, a catch for holding the lever closed, a block attached to said plunger, adapted to positively close the switch under the spring-actuated movement of the plunger, and to disengage the catch from the lever under the pneumatic actuated movement of the plunger, substantially as described.

6. In combination, the fixed contact, the movable contact, the spring for throwing the switch open, a plunger adapted to be moved one way by fluid-pressure, and a spring for returning the plunger; with means for varying the strength of said plunger-actuating spring, and a finger attached to the plunger adapted to positively close the switch, substantially as described.

7. In combination, the fixed contact, the movable contact, the spring for throwing the switch open, a plunger adapted to be moved one way by fluid-pressure, and a spring for returning the plunger; with means for varying the strength of said plunger-actuating spring, and a finger attached to the plunger adapted to positively close the switch, a spring-catch beside the switch adapted to lock the latter when closed, and a device connected to the plunger adapted to trip the catch after the finger has released the switch, substantially as described.

8. In an electric pressure-controlled switch, the combination of a fixed contact, a switch-lever having a tongue adapted to engage said contact, and an arm, and a spring for rocking said lever to move the tongue from the contact; a pressure-controlled diaphragm, a spring-pressed plunger resting thereon, a finger attached to said plunger adapted to engage the arm of the switch-lever and forcibly close the switch, and a catch adapted to engage the switch-arm and lock the switch in closed position, until the pressure under the diaphragm causes the plunger to first disengage its finger from the switch, and then disengage the catch therefrom, all substantially as and for the purpose described.

In testimony that I claim the foregoing as my own I affix my signature in presence of two witnesses.

WILLIAM J. PUGH.

In presence of—
C. F. GRAHAM,
HARRY J. HAMANN.